US012627023B2

(12) United States Patent
Lee

(10) Patent No.: US 12,627,023 B2
(45) Date of Patent: May 12, 2026

(54) HEAT DISSIPATION SHEET FOR LOW-FREQUENCY ANTENNA, METHOD FOR MANUFACTURING SAME, AND ELECTRONIC DEVICE COMPRISING SAME

(71) Applicant: AMOGREENTECH CO., LTD., Gimpo-si (KR)

(72) Inventor: Jin Hyoung Lee, Gimpo-si (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 614 days.

(21) Appl. No.: 17/662,067

(22) Filed: May 4, 2022

(65) Prior Publication Data

US 2022/0263214 A1      Aug. 18, 2022

Related U.S. Application Data

(63) Continuation of application No. PCT/KR2020/015507, filed on Nov. 6, 2020.

(30) Foreign Application Priority Data

Nov. 6, 2019      (KR) ........................ 10-2019-0141077

(51) Int. Cl.
| | |
|---|---|
| *H01Q 1/02* | (2006.01) |
| *C08K 3/04* | (2006.01) |
| *C08K 5/00* | (2006.01) |
| *C08K 5/14* | (2006.01) |
| *C08K 5/29* | (2006.01) |
| *C08K 9/06* | (2006.01) |
| *H01Q 1/22* | (2006.01) |

(52) U.S. Cl.
CPC ................ *H01Q 1/02* (2013.01); *C08K 3/04* (2013.01); *C08K 5/0025* (2013.01); *C08K 5/14* (2013.01); *C08K 5/29* (2013.01); *C08K 9/06* (2013.01); *H01Q 1/22* (2013.01); *C08K 2201/001* (2013.01); *C08K 2201/003* (2013.01)

(58) Field of Classification Search
CPC .......... C08K 3/04; C08K 5/0025; C08K 5/14; C08K 5/29; C08K 9/06; C08K 2201/001; C08K 2201/003; H01Q 1/02; H01Q 1/22
See application file for complete search history.

(56) References Cited

U.S. PATENT DOCUMENTS

| | | | |
|---|---|---|---|
| 2019/0386360 A1 | 12/2019 | Lee et al. | |
| 2020/0235593 A1* | 7/2020 | Jang ........................ | H01Q 1/526 |

FOREIGN PATENT DOCUMENTS

| | | | |
|---|---|---|---|
| CN | 1239110 A | | 12/1999 |
| CN | 1247202 A | | 3/2000 |
| CN | 102051057 A | | 5/2011 |
| CN | 110023408 A | | 7/2019 |
| JP | 2008-31358 A | | 2/2008 |
| JP | 2018-56315 A | | 4/2018 |
| KR | 10-2016-0136226 A | | 11/2016 |
| KR | 10-2017-0032861 | | 3/2017 |
| KR | 10-2017-0040777 A | | 4/2017 |
| KR | 10-1817746 B1 | | 1/2018 |
| KR | 10-2018-0061049 A | | 6/2018 |
| KR | 10-2018-0103782 A | | 9/2018 |

OTHER PUBLICATIONS

Machine Translation of JP2002363421 Description Section (Year: 2002).*
Machine Translation of KR101788792 (Year: 2017).*
Machine Translation of KR20180061049 Description Section (Year: 2018).*
Machine Translation of JP 2015-073067 Description Section (Year: 2015).*
De Luca J Sol-Gel Sci Technol Paper (Year: 2009).*
Nakaramontri Polymer Engineering and Science Paper (Year: 2015).*
International Search Report by Korean Intellectual Property Office for PCT/KR2020/015507 dated Mar. 2, 2021.
Office Action for CN 202080076812.8 by China National Intellectual Property Administration dated Feb. 22, 2025.

* cited by examiner

*Primary Examiner* — John M Cooney
*Assistant Examiner* — Adam J Berro
(74) *Attorney, Agent, or Firm* — BROADVIEW IP LAW, PC

(57)      ABSTRACT

Disclosed is a heat dissipation sheet for a low frequency antenna. The heat dissipation sheet according to an embodiment of the present invention is a heat dissipation sheet for a low frequency antenna having an operating frequency of 50 kHz to 350 kHz, and is implemented by including a matrix and a heat dissipation filler dispersed in the matrix and having graphite. According to this, the heat generated from the antenna can be quickly transferred to the outside without deterioration of the characteristics of the antenna operating in the low frequency band, so that it can be widely applied to various articles in the industry, such as electronic devices.

11 Claims, 8 Drawing Sheets heat radiation sheet

Rx antenna

Tx antenna

Rx antenna heat radiation sheet

Tx antenna default          example1          example 2          comparative example1          comparative example 2 default          example 1          comparative example 1

HEAT DISSIPATION SHEET FOR LOW-FREQUENCY ANTENNA, METHOD FOR MANUFACTURING SAME, AND ELECTRONIC DEVICE COMPRISING SAME

CROSS-REFERENCE TO RELATED APPLICATION

This Application is a continuation of pending PCT International Application No. PCT/KR2020/015507, filed on Nov. 6, 2020, which claims priority to Korean Patent Application No. 10-2019-0141077, filed on Nov. 6, 2019, the entire contents of which are hereby incorporated by references in its entirety.

TECHNICAL FIELD

The present invention relates to a heat dissipation sheet, more particularly, to a heat dissipation sheet for low-frequency antenna, a method for manufacturing the same and an electronic device including the same.

BACKGROUND ART

Recently, as electronic devices become highly integrated with light, thin, short and multifunctional, heat generation increases, and countermeasures are required. In particular, dissipating the heat generated in electronic devices is very important because it is closely related to the reliability and longevity of the device.

In the past, various heat radiation devices such as heat radiation fans, heat radiation fins, and heat pipes have been developed, and recently, various heat radiation composites such as heat radiation pads, heat dissipation sheets, and heat radiation paints added with fillers that express heat radiation performance in polymer materials have also been developed to assist or replace the heat radiation devices.

However, materials known to have high heat radiation performance generally have low resistance and high dielectric constant, thereby degrading the performance of other parts in electronic devices to which the heat radiation composite is applied. For example, the heat radiation composite may block the electromagnetic wave transmitted from an antenna or the electromagnetic wave received by an antenna, so that there is a problem in that antenna performance is deteriorated or an intended function of the antenna is lost.

Accordingly, there is an urgent need to develop a heat radiation material having excellent heat radiation characteristics while preventing degradation of components such as antennas.

DISCLOSURE

Technical Problem

The present invention has been devised in view of the above points, and an object of the present invention is to provide a heat dissipation sheet for a low frequency antenna capable of rapidly transferring heat generated from an antenna to an outside without attenuating the characteristics of the antenna, particularly the antenna having a low frequency band as an operating frequency, and a method for manufacturing the same.

In addition, another object of the present invention is to provide a heat dissipation sheet capable of minimizing or preventing the occurrence of cracks, shrinkage, and pores of the sheet even though it is designed to have excellent heat radiation performance, and having excellent flexibility to improve adhesion with an antenna, and a method for manufacturing the same.

Further, another object of the present invention is to provide a heat dissipation sheet for a low frequency antenna having improved heat radiation performance by improving compatibility between dissimilar materials, and a method for manufacturing the same.

Furthermore, another object of the present invention is to provide various industrial articles, such as electronic devices, in which, by having a heat dissipation sheet of the present invention, a low frequency antenna is operated with an initially designed operating efficiency as it is while preventing deterioration in function due to the heat generated by the low frequency antenna.

Technical Solution

In order to solve the above object, the present invention provides a heat dissipation sheet for a low frequency antenna which is disposed on a low frequency antenna with an operating frequency of 50 kHz to 350 kHz. The heat dissipation sheet for a low frequency antenna includes a matrix and a heat dissipation filler dispersed in the matrix and including graphite.

According to an embodiment of the present invention, the matrix may include the rubber-based resin crosslinked by a crosslinking agent including one or more of a peroxide-based compound and an isocyanate-based compound.

In addition, the rubber-based resin may include one or more selected from the group consisting of isoprene rubber (IR), butadiene rubber (BR), styrene-butadiene rubber (SBR), ethylene propylene diene monomer (EPDM) rubber, acrylic rubber, nitrile-butadiene rubber (NBR) and silicone rubber.

In addition, the rubber-based resin may be cross-linked by one or more crosslinking agents selected from the group consisting of an isocyanate-based resin and a peroxide-based resin.

In addition, the heat dissipation filler may be provided at least 80% by weight of a total weight of the heat dissipation sheet.

In addition, the graphite may have a surface modified with an amino silane compound. In this case, the amino silane compound may include one or more selected from the group consisting of 3-aminopropyltriethoxysilane, 3-aminopropyltrimethoxysilane and 3-aminopropylmethyldimethoxysilane.

In addition, the amino silane compound may be included in an amount of 1.0 to 4.0 parts by weight based on 100 parts by weight of the heat dissipation filler.

In addition, the graphite may be graphite flake.

In addition, the graphite may have an average particle diameter of 70 to 120 μm.

In addition, the heat dissipation sheet may have a density of 1.7 g/m$^3$ or more.

In addition, the heat dissipation sheet may have a surface resistance of 0.1 to 100Ω/□ and a thermal conductivity of 80 to 150 W/m·k.

In addition, the matrix may include a crosslinked product in which styrene-butadiene rubber (SBR) is crosslinked with an isocyanate-based crosslinking agent, the graphite may have a surface modified with an amino silane compound.

In addition, the present invention provides a method for manufacturing a heat dissipation sheet for a low frequency antenna, including the steps of (1) preparing a heat dissipation filler including graphite; and (2) preparing a preliminary sheet by mixing the heat dissipation filler with a matrix forming component.

According to an embodiment of the present invention, the matrix forming component may include a rubber-based resin, and the preliminary sheet may further include a crosslinking agent, the method may further include, after the step (2), the step of (3) crosslinking the rubber-based resin by pressing the prepared preliminary sheet.

In addition, the step (3) may include the steps of crosslinking the preliminary sheet while applying heat and pressure at a temperature of 100 to 180° C.; and cooling the crosslinked preliminary sheet to a temperature of 18 to 60° C. while applying pressure.

In addition, the present invention provides a low frequency antenna module including a low frequency antenna having an operating frequency of 50 kHz to 350 kHz, the heat dissipation sheet according to the present invention, and a magnetic field shielding sheet.

According to an embodiment of the present invention, the low frequency antenna may be disposed between the heat dissipation sheet and the magnetic field shielding sheet.

In addition, the low frequency antenna module may be a transmission module or a reception module.

In addition, the present invention provides a low frequency-reception antenna module which receives a wireless signal transmitted from a low frequency-transmission antenna having an operating frequency of 50 kHz to 350 kHz. The low frequency-reception antenna module includes a low frequency-reception antenna having an operating frequency of 50 kHz to 350 kHz and a heat dissipation sheet, the heat dissipation sheet includes a heat dissipation filler having graphite dispersed in a matrix, and is arranged to be disposed on a movement path of a wireless signal between the low frequency-transmission antenna and the low frequency-reception antenna.

In addition, the present invention provides an electronic device including the antenna module of the present invention.

Hereinafter, the terms used in the present invention will be described.

In the present invention, "on" in "B disposed on A" used to describe the positional relationship between components refers to both the case where A and B are stacked in direct contact with each other and the case where A and B are stacked with another component C interposed.

Advantageous Effect

According to the present invention, the heat dissipation sheet can rapidly transfer the heat generated from an antenna to an outside without degrading the characteristics of the antenna operating in a low frequency band. In addition, as the compatibility between dissimilar materials such as a polymer and a heat dissipation filler constituting the heat dissipation sheet increases, a heat radiation performance is further improved. Further, the occurrence of cracks, shrinkage, and pores of the sheet may be reduced or prevented even though the heat dissipation filler is designed to have a high content to have excellent heat radiation performance, and the sheet may have excellent flexibility. Furthermore, due to the excellent flexibility, it has improved adhesion with an antenna, which may increase a heat radiation efficiency. As the heat dissipation sheet having such an effect exhibits excellent heat radiation characteristics without degrading the characteristics of the low frequency antenna, it can be widely applied to various articles in the industry, such as electronic devices.

MODE FOR INVENTION

Hereinafter, embodiments of the present invention will be described in detail so that those of ordinary skill in the art can easily implement them. The present invention may be embodied in many different forms and is not limited to the embodiments described herein.

The heat dissipation sheet according to an embodiment of the present invention is a heat dissipation sheet for a low frequency antenna disposed on a low frequency antenna, for example, a low frequency antenna having an operating frequency of 50 kHz to 350 kHz, and is provided with a matrix, and a heat dissipation filler dispersed in the matrix and having graphite.

Figure 1:
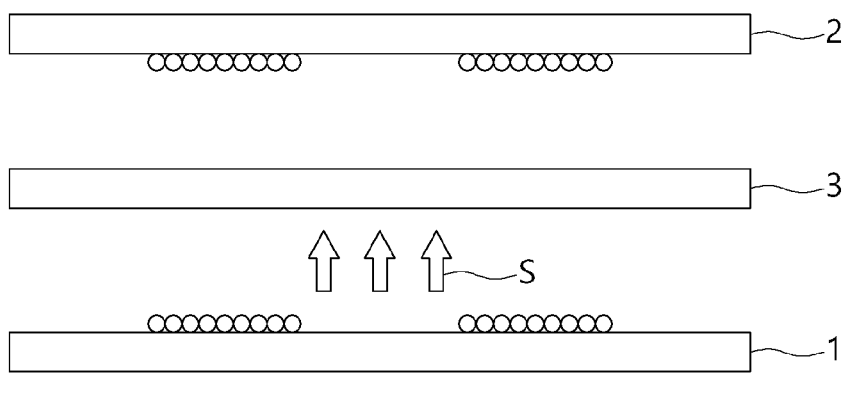
FIG. 1 is a schematic diagram showing a case in which a heat dissipation sheet is disposed between a transmission antenna and a reception antenna.

The heat dissipation filler includes graphite as a component imparting thermal conductivity to the heat dissipation sheet. Regarding the graphite, any known various types of graphite may be used without limitation. For example, the graphite may include one or more types of artificial graphite, graphite flakes, expanded graphite, and the like, and may preferably include graphite flakes. In the case of a heat dissipation sheet having graphite flakes as graphite, there is an advantage that the heat dissipation sheet can be freely disposed without considering the direction in which the low frequency antenna transmits or receives electromagnetic waves that are wireless signals. If explained with respect to FIG. 1, when the electromagnetic wave (S) is transmitted from a transmission antenna 1 toward a reception antenna 2, there is a risk that a heat dissipation sheet 3 disposed to block the transmitted electromagnetic wave (P) may reduce the reception efficiency of the electromagnetic wave (S) of the reception antenna 2 according to the electrical characteristics of the heat dissipation sheet 3. For example, when a copper sheet, an aluminum sheet, or a graphite sheet is used as the heat dissipation sheet 3, the transmitted electromagnetic wave (S) is blocked by the heat dissipation sheet 3 even though excellent heat radiation characteristics can be obtained, so that the transmission efficiency of signals may be significantly lowered or the transmission of signals itself may not be performed. However, in the case of the heat dissipation sheet according to an embodiment of the present invention, in particular, in the case of a heat dissipation sheet having graphite flakes, there is an advantage in that excellent heat radiation characteristics can be expressed without or with minimum reduction of the transmission/reception efficiency of electromagnetic waves even if the sheet is located on the path through which electromagnetic waves are transmitted and received.

In addition, the heat dissipation filler including the graphite may have an average particle diameter of 1 to 200 μm, preferably 70 to 120 μm, and more preferably 70 to 100 μm. When the particle size of the heat dissipation filler including the graphite is adjusted to an appropriate level, it is easy to increase the content of the heat dissipation filler in the heat dissipation sheet, the sheet formability can be improved, and a surface quality can be improved by preventing the heat dissipation filler from sticking to the surface after sheet formation. If the average particle diameter of the heat dissipation filler exceeds 200 μm, it may be difficult to increase the content of the heat dissipation filler in the matrix implemented with the polymer, it may not be very easy to form a sheet, and there is a possibility that the surface quality may be deteriorated. In addition, even if the particle size increases, the improved heat radiation performance may be insignificant, and on the contrary, there is a fear that the heat radiation performance is rather deteriorated due to an increase in the number of pores contained the matrix. However, the heat dissipation filler may have the average particle diameter of 1 μm or more, preferably 50 μm or more, and more preferably 70 μm or more. Through this, dispersibility and content in the matrix can be further increased, which has the advantage of further improving thermal conductivity and improving thermal conduct uniformity. On the other hand, in the present invention, the particle diameter of the heat dissipation filler refers to the diameter when the shape is spherical, the particle diameter refers to the longest distance among the straight-line distances between two different points on the surface when the shape is a polyhedron or amorphous shape rather than a plate shape, or the particle diameter refers to the longest distance among the straight-line distances between two different points of the upper or lower edge when the shape is plate shape.

On the other hand, the heat dissipation filler may have a problem with compatibility with the polymer resin forming the matrix, and if the compatibility is not good, the thermal conductivity at the interface between the polymer resin and the heat dissipation filler may decrease, so that micro-lift phenomenon at the interface can be occurred, which may further reduce heat radiation performance. In addition, since it may cause cracks in the corresponding portion, the durability of the heat dissipation sheet may also be deteriorated. Furthermore, the dispersibility of the heat dissipation filler in the matrix may be significantly reduced, and thus it may be difficult to express uniform heat radiation characteristics, and it may be very difficult to design the heat dissipation filler with a high content in the heat dissipation sheet.

The present invention is provided with a heat dissipation filler with a modified surface in order to solve this problem. The surface-modified heat dissipation filler can minimize or prevent the above problems by increasing the compatibility with a matrix forming resin, particularly a crosslinked rubber-based resin, more specifically, a matrix in which styrene-butadiene rubber resin is crosslinked by an isocyanate-based crosslinking agent.

In addition, with respect to the surface modification of the heat dissipation filler including graphite, any known modification capable of increasing the compatibility between the heat dissipation filler and the matrix forming resin may be used without limitation. However, preferably, the modification may be the modification with a silane compound. The silane compound may be, for example, an amino silane compound, an epoxy silane compound, a vinyl silane compound, and a silane compound containing a metal element. Through the use of such a silane compound, there is an advantage in which the interface characteristics between the matrix and the heat dissipation filler is improved, which has the advantage of implementing heat radiation characteristics. More preferably, the silane compound may be an amino silane compound. When a different type of silane compound is used, it is difficult to prevent damage to the matrix portion in the heat dissipation sheet, and there is a risk that the heat radiation characteristics may also be deteriorated due to the damage. In addition, in the case of epoxy silane, the heat radiation characteristics may be rather deteriorated. In particular, when the heat dissipation filler is provided in a high content such that it is 90% by weight or more in the matrix, and the shape of the heat dissipation filler is plate or the surface of the heat dissipation filler is smooth due to low roughness, or even when the surface of the heat dissipation filler is modified with the silane compound, damage such as peeling, cracking, splitting, etc. of the matrix portion may easily occur due to external force such as elongation applied to the heat dissipation sheet. However, among the silane compounds, the amino silane compound can minimize or prevent such damage, and has the advantage of improving the heat radiation characteristics and expressing the heat radiation characteristics for a long time even in an environment to which an external force is applied. Furthermore, regarding a change in thickness of the matrix including a cured rubber-based resin even under extreme conditions, amino silane has an advantage in that it can improve this problem, compared to other types of silane compounds As the amino silane compound, a known amino silane compound may be used, for example, one or more selected from the group consisting of 3-aminopropylmethyldiethoxysilane, 3-aminopropyldimethylethoxysilane, 3-aminopropyltriethoxysilane, 3-aminopropyltrimethoxysilane, 4-aminobutyltrimethoxysilane, 3-(meta-aminophenoxy) propyltrimethoxysilane, and normal-(2-aminoethyl)-3-aminopropylmethyldimethoxysilane may be used. Preferably 3-aminopropyltriethoxysilane, 3-aminopropyltrimethoxysilane and 3-aminopropylmethyldimethoxysilane may be used.

In addition, the amino silane compound may be provided in an amount of 1.0 to 4.0 parts by weight, more preferably 2.5 to 4.0 parts by weight based on 100 parts by weight of the heat dissipation filler, thereby improving heat radiation characteristics. That is, the use of the amino silane compound is advantageous for achieving the object of the present invention, and at the same time, is advantageous for improving the adhesion of the matrix to be uniform. If the amino silane compound is contained in an amount of less than 1.0 part by weight, the achievement of the desired effect through the amino silane compound may be insignificant. In addition, if the amino silane compound is provided in excess of 4.0 parts by weight, a release film may not be easily removed when the release film is removed, and the heat dissipation filler may be adhered to the release film. In addition, there is a fear that the flexibility of the heat dissipation sheet may decrease.

Meanwhile, the amino silane compound is provided on the surface of the heat dissipation filler, and when the amino silane compound is included in the matrix formation, it may be difficult to improve the interfacial characteristics between the heat dissipation filler and the matrix.

The heat dissipation filler may further include metals, alloys, ceramics, and other types of carbon-based components known to be used in heat dissipation sheets or to have thermal conductivity, in addition to the above-mentioned graphite. For example, in order for the heat dissipation sheet to have a lower dielectric constant characteristic, the heat dissipation filler may further include alumina, yttria, zirconia, aluminum nitride, boron nitride, silicon nitride, silicon carbide and single crystal silicon. On the other hand, when another type of heat dissipation filler other than graphite is further provided, the average particle diameter and surface modification of the above-mentioned graphite can be equally applied to the additionally provided heat dissipation filler.

On the other hand, when a different type of heat dissipation filler other than graphite is further provided, the wireless signal transmission and reception of the low frequency antenna may be affected according to the electrical characteristics of the added heat dissipation filler. Accordingly, it is preferable that the heat dissipation filler of an appropriate type is provided in an appropriate content at a level at which the implemented heat dissipation sheet does not affect or minimizes the wireless signal transmission and reception of the low frequency antenna.

Next, a matrix, which is a substrate in which the above-described heat dissipation filler including graphite is dispersed, will be described. The matrix is a carrier for accommodating the heat dissipation filler, and functions to maintain the shape of the heat dissipation sheet. The matrix may be formed through a matrix forming component, which is an organic compound used to prepare a conventional sheet. However, the matrix may be formed of a main resin containing a rubber-based resin such that the heat dissipation sheet includes the heat dissipation filler in an increased content, and phenomena such as cracking, shrinkage or pore occurrence in the implemented heat dissipation sheet is reduced or prevented. In addition, the rubber-based resin may be more advantageous in imparting flexibility to the heat dissipation sheet, and in expressing excellent adhesion even on a stepped surface.

With respect to the rubber-based resin, any known rubber-based resin may be selected without limitation in its type. For example, the rubber-based resin may include one or more selected from the group consisting of isoprene rubber (IR), butadiene rubber (BR), butyl rubber (IIR), styrene-butadiene rubber (SBR), ethylene propylene diene monomer (EPDM) rubber, acrylic rubber, nitrile-butadiene rubber (NBR), fluoro rubber, urethane rubber and silicone rubber. For example, the rubber-based resin may be styrene-butadiene rubber, and has advantages in terms of excellent solubility in solvents, low manufacturing cost, increased breath of selection of curing agents, and low density, compared to other types.

In addition, the weight average molecular weight of the rubber-based resin is preferably adjusted within an appropriate range. The rubber-based resin with a low molecular weight is advantageous in designing the heat dissipation filler with a high content, but may be disadvantageous in terms of thermal conductivity. The rubber-based resin with a high molecular weight is advantageous for thermal conductivity, but may make it difficult to design a high content of the heat dissipation filler in the heat dissipation sheet.

In addition, the content of the heat dissipation filler may vary depending on the type of the main resin. In terms of the content of the heat dissipation filler, it may be better to use the main resin having a low density. For example, it may have a density of 1 $g/m^3$ or less. If the main resin having the density exceeding the range is used, it may be difficult to design the content of the heat dissipation filler in the heat dissipation sheet to be high, and accordingly, it may be difficult to achieve sufficient heat radiation characteristics.

On the other hand, in addition to the above-mentioned rubber-based resin, other types of resin may be additionally contained. Even in this case, it may be better to use a resin having a low density in order to increase the content of the heat dissipation filler in the matrix, and for example, the density may be less than 1 $g/m^3$. However, even when other types of resin are included as an auxiliary, the resin is preferably used in an amount of 10% by weight or less based on the total weight of the matrix. The other types of resins may be, for example, one or more selected from the group consisting of high-density polyethylene, polycarbonate, polyamide, polyimide, polyvinyl chloride, polypropylene, polystyrene, polyisobutylene, modified polypropylene ether (PPE), polyethyleneimide (PEI), polyetheretherketone (PEEK), acrylonitrile-butadiene-styrene (ABS), epoxy-based, acrylic-based, and polyurethane.

On the other hand, although the rubber-based resin has a different degree of elastic restoring force depending on the specific type, the resin has an elastic restoring force of a certain level or more, so it is advantageous to provide a high content of heat dissipation filler in the sheet, but it is not easy to implement the sheet with a thin thickness. That is, it is not easy to increase the density of the heat dissipation sheet, and the heat dissipation sheet undergoes a process of pressing the heat dissipation sheet to increase the density and to remove the pores contained in the matrix. However, it is not easy to increase the density of the implemented sheet including the rubber-based resin as it is restored to the thickness before compression by the elastic restoring force after a predetermined time has elapsed even after the sheet is compressed to a desired thickness. Accordingly, the matrix of the present invention includes a crosslinked rubber-based resin, through which the density after compression can be maintained even over time, and mechanical strength can be improved by increasing the bonding force between the components constituting the matrix. In addition, since the distance between the heat dissipation fillers is close in the thickness direction of the heat dissipation sheet or the contact between the heat dissipation fillers can be significantly increased, it may be more advantageous to improve the thermal conductivity in the vertical direction.

The crosslinking can be achieved through a crosslinking agent. In consideration of the type of rubber-based resin selected, a crosslinking agent that is known to be suitable for crosslinking may be used without limitation. For example, the crosslinking agent may be one or more selected from the group consisting of polyolefin-based, isocyanate-based, and peroxide-based. From the viewpoint of being advantageous in minimizing the increase in thickness that may occur under various conditions of use after crosslinking the rubber-based resin, particularly styrene-butadiene rubber, and in maintaining an initially set density, the crosslinking agent may preferably be one or more of an isocyanate-based and a peroxide-based type. On the other hand, in terms of mass production, the isocyanate-based crosslinking agent may be more advantageous in terms of storage stability of the sheet forming composition and the surface quality during sheet formation. In the case of the isocyanate-based crosslinking agent, a known crosslinking agent may be used, and for example, a block isocyanate-based crosslinking agent may be used.

In addition, the crosslinking agent may be contained in an amount of 1 to 10 parts by weight, more preferably 3 to 7 parts by weight, based on 100 parts by weight of the rubber-based resin. If the crosslinking agent exceeds 10 parts by weight, flexibility is reduced, and matrix hardness and brittle characteristics are increased, so that damage such as matrix breakage may easily occur. In addition, when the amount of the crosslinking agent is less than 1 part by weight, the sheet formability, shape stability, and heat resistance of the heat dissipation sheet may be deteriorated, and it may be difficult to implement the density of the heat dissipation sheet to a desired level.

The above-mentioned heat dissipation filler including graphite may be provided in 80% by weight or more, 90% by weight as another embodiment, or 92% by weight as another embodiment, of the total weight of the heat dissipation sheet. Thus, even in a state in which the heat dissipation filler is provided with a high content, breakages or cracks may not occur, and excellent flexibility can be expressed. If the heat dissipation filler exceeds 92% by weight, it may be difficult to form a sheet. In addition, there is a possibility that the heat radiation characteristics may be deteriorated as the heat insulating effect is expressed due to the inclusion of pores in the matrix. In addition, the heat dissipation sheet may have the density of 1.7 $g/m^3$ or more, more preferably 1.8 $g/m^3$ or more, through which the heat dissipation filler may be dispersed at a high filling rate, and the sheet can be implemented in a very thin thickness, thereby having advantages in achieving excellent heat radiation characteristics.

In addition, the heat dissipation sheet may have a thickness of 5 to 200 μm, and may be 20 to 100 μm, but is not limited thereto, and may be appropriately changed in consideration of an application place, heat radiation performance, and the like.

In addition, the heat dissipation sheet may have a surface resistance of 0.1 to 100Ω/□, a relative permittivity of 100 or less at a frequency of 28 GHz, and a thermal conductivity of 60 to 150 W/m·k, more preferably, 80 to 150 W/m·k. As described above with reference to FIG. 1, the heat dissipation sheet exhibiting high thermal conductivity may interfere with the wireless signal transmission and reception of the low frequency antenna, and the heat dissipation sheet with the surface resistance of 0.1 to 100Ω/□ may be more suitable for minimizing or preventing the effects of signal disturbance, signal attenuation, and/or signal blocking on the wireless signal transmission/reception of the low frequency antenna. In particular, if the surface resistance exceeds the above range and the electrical conductivity increases, there is a risk that the wireless signal transmission efficiency may be significantly reduced or the function may be lost. In addition, when the heat dissipation sheet has the thermal conductivity is 60 to 150 W/m·k while having a level of surface resistance that does not affect the transmission and reception of wireless signals, it can dissipate the heat generated from the low frequency antenna to an outside more quickly, and thus it is advantageous to prevent the deterioration of the characteristics of the low frequency antenna due to the generated heat or the deterioration or function degradation of the surrounding parts.

In addition, the heat dissipation sheet may have a relative permittivity of 100 or less at a frequency of 28 GHz, thereby further minimizing the influence of transmission and reception of wireless signals. More specifically, the relative permittivity may be 100 or less at a predetermined frequency, for example, 1 GHz, 5 GHz, 10 GHz, 15 GHz, 20 GHz, 25 GHz, 28 GHz, 30 GHz, or 35 GHz.

The above-described heat dissipation sheet may be manufactured by a manufacturing method described later, but is not limited thereto.

The heat dissipation sheet according to an embodiment of the present invention may be manufactured by the method including the steps of (1) preparing a heat dissipation filler including graphite, and (2) preparing a preliminary sheet by mixing the heat dissipation filler with a matrix forming component.

First, as the step (1), the step of preparing the heat dissipation filler having graphite is performed. In this case, the graphite may have been subjected to a process for modifying a surface. The surface modification may be performed by appropriately employing a known method in consideration of the type of the modification. For example, after wetting the heat dissipation filler using an organic solvent such as ethanol, it is mixed with a silane compound and stirred at 40 to 80° C. for 3 hours or more, and then washed and dried to obtain the heat dissipation filler with the modified surface.

Next, as the step (2) of the present invention, the step of preparing a preliminary sheet by mixing the prepared heat dissipation filler with a matrix forming component is performed.

The preliminary sheet may be manufactured by a conventional method for manufacturing a heat dissipation sheet using a conventional heat dissipation sheet forming composition including a matrix forming component and a heat dissipation filler. Particularly, the heat dissipation sheet forming composition may further include a known solvent suitable for dissolving the matrix forming component. For example, toluene, xylene, methyl ethyl ketone, and the like may be used as the solvent. For example, the content of the solvent may be 100 to 1,000 parts by weight based on 100 parts by weight of the matrix forming component, and the content may be adjusted in consideration of an appropriate viscosity or the type of the matrix forming component according to a sheet forming method.

In addition, the matrix forming component may be, for example, a rubber-based resin, and the heat dissipation sheet forming composition may further include a crosslinking agent capable of crosslinking the rubber-based resin. The crosslinking agent may be provided in an amount of 1 to 10 parts by weight, more preferably 3 to 7 parts by weight, based on 100 parts by weight of the rubber-based resin. When the content of the crosslinking agent is less than 1 part by weight, the sheet formability, shape stability, and heat resistance of the heat dissipation sheet may be reduced, and it may be difficult to achieve a desired level of density of the heat dissipation sheet. In addition, when the content of the crosslinking agent exceeds 10 parts by weight, there is a risk that the hardness increases and the flexibility decreases. On the other hand, the rubber-based resin in the preliminary sheet may be in a state in which the crosslinking reaction by the crosslinking agent has not occurred at all, but may be in a B-stage state in which a partial crosslinking reaction has occurred.

The heat radiation forming composition may further include known additives such as a pH adjuster, a flame retardant, a leveling agent, a dispersant and an antifoaming agent, and the present invention is not particularly limited with respect to the specific type and content of the additive.

The heat dissipation sheet forming composition may be subject to a stirring process using a 3-Roll-Mill and/or PL mixer to uniformly disperse the heat dissipation filler and obtain an appropriate viscosity. The stirring process may use a high-power disperser such as 3-Roll-Mill to improve the dispersibility of the heat dissipation filler, and to improve the thermal conductivity, density and flexibility of the heat dissipation sheet.

In addition, a defoaming process for removing bubbles generated in the stirring process may be performed together with the stirring process or after the stirring process.

Thereafter, the homogeneously prepared heat dissipation sheet forming composition may be prepared as a sheet phase by a conventional method, for example, may be processed on a substrate to form a sheet shape. A method of treating the heat dissipation sheet forming composition on the substrate may employ a known coating method. For example, knife coating using a comma coater may be used, but is not limited thereto.

The heat dissipation sheet forming composition processed into a sheet phase on the substrate may be dried at 70 to 130° C. In another example, the heat dissipation sheet forming composition may be dried at an initial temperature of 70 to 85° C., and then the drying temperature may be increased up to a final temperature of 110 to 130° C. for completing the drying. In addition, since the drying time may vary depending on the drying temperature, the present invention is not particularly limited thereto. On the other hand, the thickness of one dried preliminary sheet may be 80 to 150 μm, but is not limited thereto.

Next, as step (3), when the heat dissipation sheet forming composition includes a crosslinking agent, a crosslinking process may be further performed for the rubber-based resin included in the prepared preliminary sheet.

The crosslinking may be performed by an appropriate method depending on the type of the rubber-based resin and the type of the crosslinking agent. For example, it may be a thermal crosslinking reaction by heat treatment or a photo crosslinking reaction by light irradiation. For example, when the crosslinking reaction is induced by heat treatment, it may be carried out by applying heat of 120 to 170° C.

The step (3) according to an embodiment of the present invention may be performed by including the step of stacking several preliminary sheets and then applying heat and/or light, and pressure to the preliminary sheets in a stacked state.

The case where heat and/or light and pressure are applied to the several stacked preliminary sheets may be advantageous in implementing the desired level of thickness and density of the heat dissipation sheet, compare to the case where heat and/or and pressure are applied to one preliminary sheet. In addition, the orientation of the heat dissipation fillers within the heat dissipation sheet is improved through the applied pressure, and the separation distance between the heat dissipation fillers in the thickness direction, that is, the vertical direction can be significantly reduced, which can be advantageous for improving the thermal conductivity in the vertical and horizontal directions.

Preferably, 2 to 5 preliminary sheets may be stacked. If more than 5 preliminary sheets are stacked, the preliminary sheets may be pushed during the pressurization process of the stacked preliminary sheets, so uniform pressure may not be performed, and there is a risk of thickness variation depending on the location of the heat dissipation sheet.

On the other hand, if the thickness of one preliminary sheet is very thin (for example, 40 μm or less), it may not be easy to stack the preliminary sheets in the process. Therefore, it is preferable to perform the step (3) for one sheet, without stacking multiple sheets.

On the other hand, the preliminary sheet manufactured through the step (2) and the heat dissipation sheet manufactured through the step (3) may have the thickness reduction rate of 20% or more, preferably 25%, more preferably 40% or more, calculated according to Equation 1 below. Accordingly, the high content and high density design of the heat dissipation filler in the heat dissipation sheet is possible, which may be more advantageous in improving heat radiation characteristics.

$$\text{thickness reduction rate } (\%) = \qquad \text{[Equation 1]}$$
$$\frac{\text{thickness of preliminary sheet } (\mu m) - \text{thickness of heat dissipation sheet } (\mu m)}{\text{thickness of preliminary sheet } (\mu m)}$$

In addition, although in the heat dissipation sheet manufactured through the step (3), a matrix is implemented using a rubber-based resin, a thickness change rate calculated by Equation 2 below after left at 40° C. for 50 hours may be 10% or less, preferably 5% or less, more preferably 2% or less, even more preferably 1% or less, even more preferably 0.5% or less. Through this, there is an advantage in minimizing the deterioration of the heat radiation characteristics that occur as the thickness increase or the quality deterioration due to a shape deformation such as thickness fluctuates or non-uniform thickness after the implementation of the heat dissipation sheet.

$$\text{thickness change rate } (\%) = \qquad \text{[Equation 2]}$$
$$\frac{\text{thickness of heat dissipation sheet after left } (\mu m) - \text{thickness of heat dissipation sheet before left } (\mu m)}{\text{thickness of heat dissipation sheet after left } (\mu m)}$$

The step (3) according to an embodiment of the present invention may include the steps of crosslinking while applying heat and pressure with respect to at least one preliminary sheet, and cooling the crosslinked preliminary sheet.

The crosslinking step can induce a thermal crosslinking reaction while applying pressure. Through this, in addition to realizing the desired thickness, the density of the heat dissipation sheet can be increased, and the content of the heat dissipation filler per unit volume can be further increased, and at the same time, the distance between the heat dissipation fillers can be shortened depending on the pressure, so there is an advantage that heat radiation characteristics can be further improved. In addition, when the heat dissipation filler has a plate shape, the orientation in the horizontal direction within the heat dissipation sheet is improved, and the vertical distance between the heat dissipation fillers is shortened, so that both the horizontal and vertical heat radiation characteristics can be improved. At this time, the applied pressure may be 2.5 to 5 kgf/mm², so that it may be advantageous in achieving the desired effect of the present invention.

In addition, the heat applied in the crosslinking step may be 100 to 180° C., preferably 110 to 170° C., more preferably 150 to 180° C., the execution time may be 10 to 60 minutes, more preferably 15 to 55 minutes.

Figure 9:
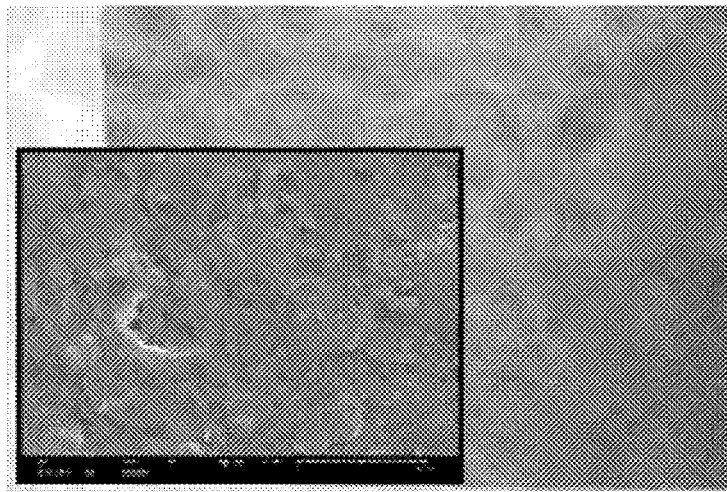
FIGS. 9 and 10 are SEM photographs of the surface of a heat dissipation sheet manufactured by different methods according to an embodiment of the present invention.
Figure 10:
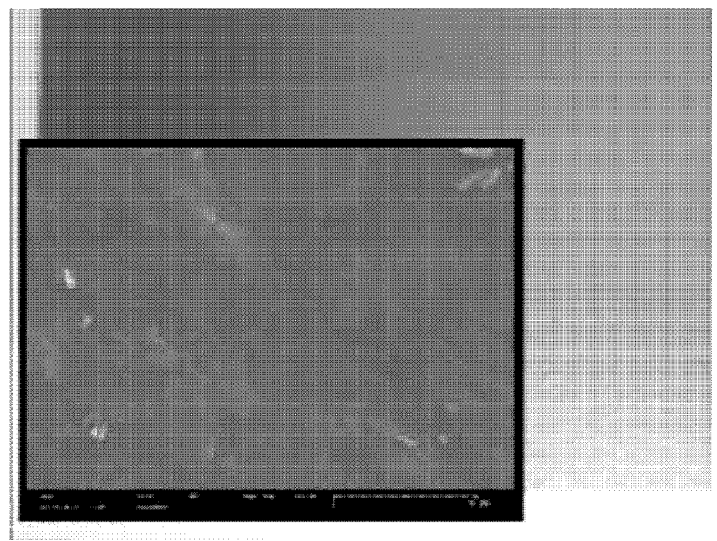

In addition, the cooling step is to avoid the problems of density reduction and non-uniform thickness due to matrix expansion occurring when left at room temperature after crosslinking through heat, and has the advantage of realizing the heat dissipation sheet having a higher density and uniform thickness. In addition, it is possible to realize the heat dissipation sheet having a better surface quality through the cooling step. As shown in FIGS. 9 and 10, it can be confirmed that the surface quality of the heat dissipation sheet of FIG. 10 in which the cooling step is performed is superior to the surface of the heat dissipation sheet of FIG. 9 in which the cooling step is not performed after crosslinking through heat.

The cooling step may be terminated when the manufactured heat dissipation sheet is cooled to a temperature of 60° C. or less, preferably 18 to 60° C., and more preferably 18 to 50° C. In addition, the cooling step may be performed for 10 to 60 minutes, preferably 15 to 55 minutes. In addition, the cooling rate may be, for example, 5 to 30° C./min. If the cooling temperature exceeds 60° C., there is a risk of thickness fluctuation, and in the cooling process, the heat dissipation sheet may be attached to a cooling device, for example, a surface of a press and not easily detach from it, and this significantly increases the deterioration of the surface quality of the heat dissipation sheet and there is a risk of lowering productivity.

In addition, the cooling step may also be performed while applying a pressure, so that there is an advantage that can minimize the thickness variation of the heat dissipation sheet. At this time, the applied pressure may be, for example, 2.5 to 5 kgf/mm².

On the other hand, the steps of crosslinking and cooling may be performed while applying pressure through a first press and a second press having different temperatures. In this case, productivity can be further improved compared to when the temperature condition is changed using one press, and the time between the crosslinking step and the cooling step can be minimized or easily adjusted to a desired level, so there is advantage of improving the quality of the heat dissipation sheet. The temperature and pressing time of the first press may be the temperature and execution time of the above-described crosslinking step, and the temperature and pressing time of the second press may be the temperature and execution time of the above-described cooling step.

The heat dissipation sheet manufactured through the above-described method may implement a low frequency antenna module, together with a low frequency antenna having an operating frequency of 50 kHz to 350 kHz and a magnetic field shielding sheet.

The low frequency antenna has a frequency band of 50 kHz to 350 kHz as an operating frequency, and may be, for example, a wireless power transmission (WPT) antenna or a magnetic secure transmission (MST) antenna. The wireless power transmission antenna may be a Qi standard or PMA standard antenna operating in a magnetic induction method in the frequency band. Alternatively, the magnetic security transmission antenna may be an antenna of a well-known standard capable of generating a non-directional electromagnetic wave that can pass through a reader head in a POS terminal although it is spaced apart a certain distance from the POS terminal, so that card information is transmitted to the POS terminal so that payment can be performed using a portable device such as a smartphone, in the same way as a magnetic card by the magnetic security transmission technique.

Hereinafter, a case in which the low frequency antenna 200 is a wireless power transmission antenna will be described in detail. When described with reference to FIG. 2, the wireless power transmission antenna may be configured to include a circular, oval, or rectangular flat-plate coil 210 in which a conductive member having a predetermined length is wound a plurality of times in a clockwise or counterclockwise direction, and a support member 220 supporting the coil. The support member 220 may be a circuit board including a circuit for controlling a wireless signal transmitted or received by the coil with the purpose of supporting the coil 210. Alternatively, the support member 220 may be a heat radiation support member designed to have heat radiation characteristics for transferring the heat generated from the coil downward, together with the purpose of supporting it. The heat radiation support member may be, for example, a heat radiation plastic that contains a known heat conductive filler and is injection molded.

Figure 3:
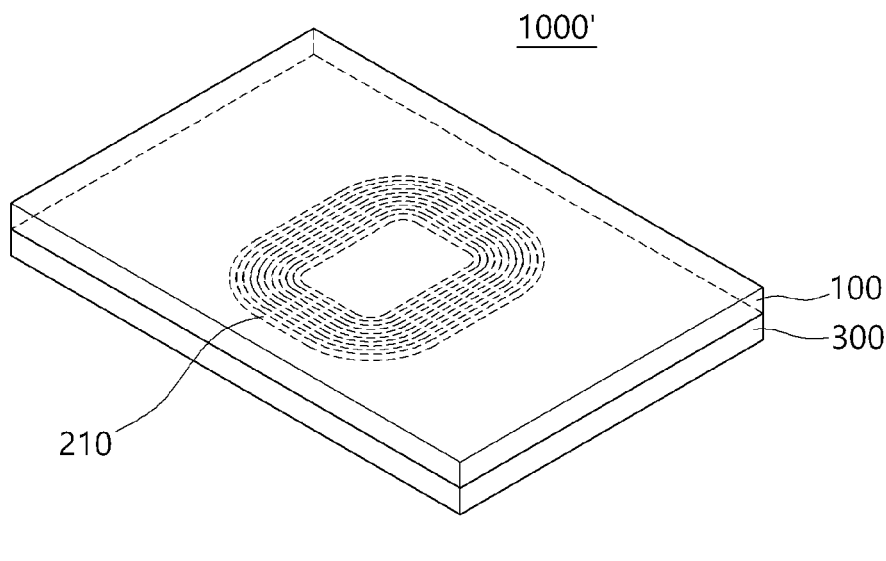
Figure 4:
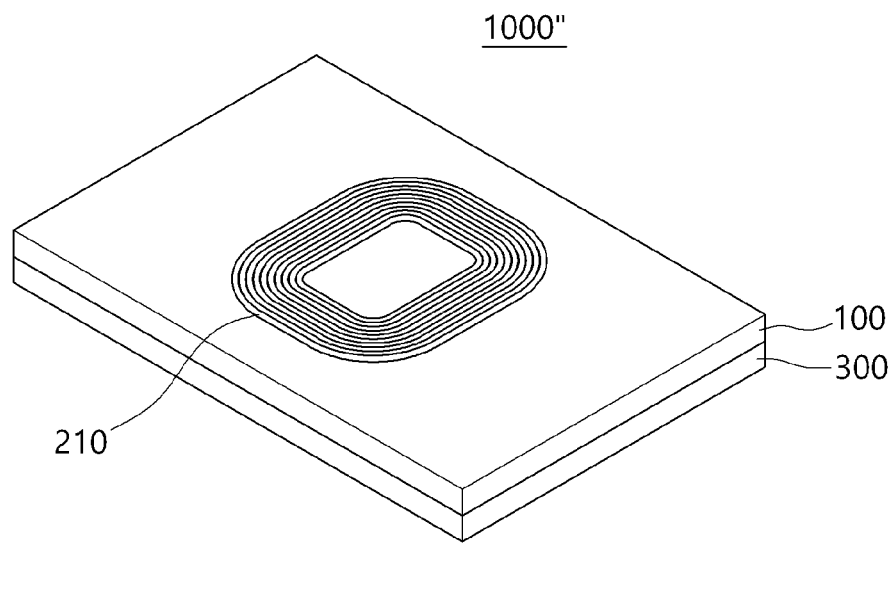

Meanwhile, as shown in FIGS. 3 and 4, the wireless power transmission antenna may be configured as a flat-plate coil 210 without the support member 220. In this case, the flat-pate coil 210 may be directly disposed on a magnetic field shielding sheet 300 or the heat dissipation sheet 100.

Alternatively, the wireless power transmission antenna may be implemented by patterning a conductor such as copper foil in a loop shape on one surface of the circuit board or forming a loop-shaped metal pattern using conductive ink. Here, the circuit board may be a flexible circuit board made of a material such as PI or PET, or a rigid circuit board made of a material such as FR4. When the wireless power transmission antenna is a metal pattern patterned on the circuit board, the heat dissipation sheet according to an embodiment of the present invention may be attached to the opposite surface of the one surface of the circuit board on which the metal pattern is formed, or may be attached to directly contact the metal pattern.

Next, the magnetic field shielding sheet 300 shields the magnetic field generated by the wireless signal induced in the low frequency antenna and increases the collection speed of the magnetic field in a required direction, thereby improving the transmission efficiency of the wireless signal. In addition, the magnetic field shielding sheet may be a plate-shaped member having a predetermined area.

In addition, regarding the magnetic field shielding sheet 300, any known magnetic field shielding sheet used together with an antenna may be used without limitation, and for example, a magnetic material may be used. The magnetic material may be a soft magnetic material, and non-limiting examples thereof include pure iron or alloy steel such as silicon steel sheet and permalloy, or Fe-based alloy of amorphous or nanocrystalline grains such as Fe—Co-based alloy, Fe—Si-based alloy, etc. Alternatively, it may be a known soft ferrite such as Mn—Zn, Ni—Zn, Mg—Zn.

In addition, the magnetic field shielding sheet 300 may have a form in which a plurality of magnetic sheets is stacked in multiple layers via an adhesive layer, and the plurality of magnetic sheets may be flake-treated and separated into a plurality of fine pieces, Neighboring micropieces may be entirely insulated or partially insulated.

In addition, the magnetic field shielding sheet 300 may be provided with an appropriate size to cover an area corresponding to the low frequency antenna 200 so as to increase the performance of the low frequency antenna 200.

The above-described low frequency antenna modules 1000 and 1000' may be a transmission module for transmitting a wireless signal or a reception module for receiving a wireless signal.

The arrangement of the heat dissipation sheet 100, the low frequency antenna 200 (or the flat-plate coil 210) and the magnetic field shielding sheet 300 will be described with reference to FIGS. 2 to 4.

Figure 2:
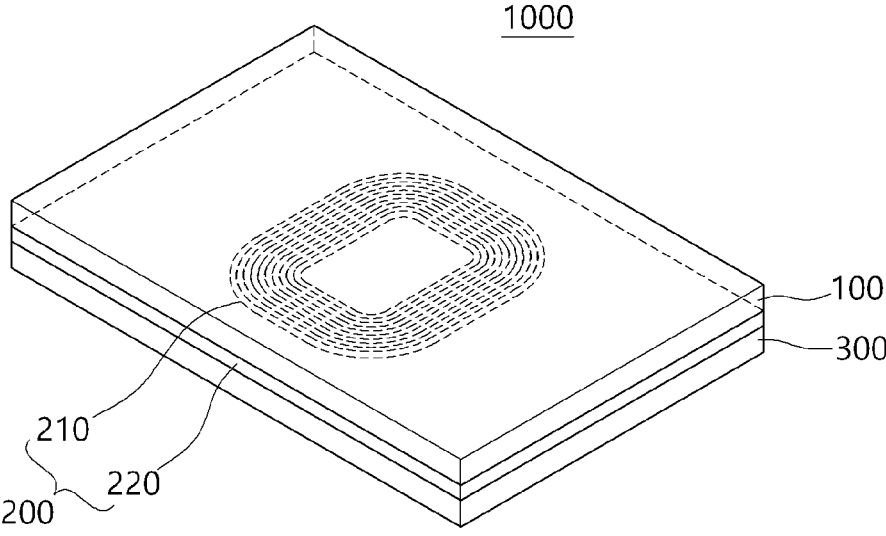
FIGS. 2 to 4 are perspective views of a low frequency antenna module according to various embodiments of the present invention.

The low frequency antenna modules 1000 and 1000' of FIGS. 2 and 3 are disposed such that the heat dissipation sheet 100 directly covers the upper portion of the flat-plate coil 210 of the low frequency antenna 200. In this case, the upper direction of the flat-plate coil 210 may be the receiving direction of the wireless signal when the low frequency antenna modules 1000 and 1000' are the reception antenna modules. In addition, the magnetic field shielding sheet 300 may be disposed on the lower portion of the flat-plate coil 210 to increase the collection speed of the wireless signal received from the upper portion of the flat-plate coil 210. As described above, since the heat dissipation sheet 100 according to the present invention has little effect on the reception of the wireless signal even if it is positioned on the path through which the wireless signal is received as shown in FIGS. 2 and 3, it enables the expression of heat radiation performance without being restricted by the arrangement position, and through this, the module can be freely designed, compared to the conventional heat dissipation sheet used together with the antenna.

Alternatively, as shown in FIG. 4, the low frequency antenna module 1000" is disposed such that the heat dissipation sheet 100 supports the lower surface of the flat-plate coil 210 of the low frequency antenna 200, and the magnetic field shielding sheet 300 can be provided on the lower portion of the heat dissipation sheet 100. Meanwhile, a low frequency antenna module may be implemented by changing the positions of the heat dissipation sheet 100 and the magnetic field shielding sheet 300 of FIG. 4.

On the other hand, although it has been described that the low frequency antenna modules 1000 and 1000' include the magnetic field shielding sheet 300, the magnetic field shielding sheet may be omitted in the module configuration.

In addition, the above-described heat dissipation sheet 100 or the low frequency antenna module (1000, 1000', 1000") provided with the heat dissipation sheet 100 can be provided to implement an electronic device. The electronic device may be a known electronic device having an antenna capable of transmitting and receiving wireless signals. For example, the electronic device may be various electronic devices such as electronic devices having communication means such as smart phones, tablet PCs, notebook PCs, etc., and home appliances to which communication technology can be broadly applied according to IoT technology. For example, the heat dissipation sheet 100 may be very useful for electronic devices, such as 5G smartphones or tablet PCs, which generate high heat and of which performance may be degraded due to the high heat.

EXAMPLES

The present invention will be described in more detail through the following examples, but the following examples are not intended to limit the scope of the present invention, which should be construed to aid understanding of the present invention.

Example 1

Based on 100 parts by weight of SBR (200° C. MFR 5 g/min, weight average molecular weight of 900,000), 3 parts by weight of bis(tert-butylphenoxy-2-isopropyl)benzene, which is a peroxide-based crosslinking agent, 1200 parts by weight of graphite flake having an average particle diameter of 80 μm and having a surface modified with 3-aminopropyltriethoxysilane that is amino silane compound, and toluene as a solvent were mixed and stirred to prepare a heat dissipation sheet forming composition having a viscosity of about 2500 cps. In this case, the graphite flake whose surface was modified with an amino silane compound was prepared by soaking the graphite flake in ethanol, mixing with 3-aminopropyltriethoxysilane, stirring at 60° C. for 4 hours, washing and drying. In the finally obtained graphite flake of which surface is modified with the amino silane compound, 2.5 parts by weight of the amino silane compound was provided with respect to 100 parts by weight of the graphite flake.

Thereafter, the sheet was prepared using a comma coater, and then, dried at 120° C. to prepare a preliminary sheet having a thickness of 110 μm. After stacking two preliminary sheets, a release film was attached on the uppermost preliminary sheet, and a pressure of 3.1 kgf/mm² was applied using a first press of a temperature of 160° C. to induce a thermal crosslinking reaction for 40 minutes. Thereafter, a cooling process was performed for 40 minutes in a state of applying the pressure of 3.1 kgf/mm² using a second press of a temperature of 50° C. to prepare the heat dissipation sheet having the final thickness of 50 μm and the content of the heat dissipation filler of 90% by weight.

Example 2

It was prepared in the same manner as in Example 1, except that the modified graphite flake was changed to the artificial graphite modified in the same manner to prepare a heat dissipation sheet of the same thickness.

Comparative Example 1

It was prepared in the same manner as in Example 1, except that the modified graphite flake was changed to the boron nitride modified in the same manner to prepare a heat dissipation sheet of the same thickness.

Comparative Example 2

A copper foil having a thickness of 0.05 mm was prepared as a heat dissipation sheet.

Experimental Example 1

The following physical properties of the heat dissipation sheets according to Examples 1, 2 and Comparative Examples 1, 2 were measured and shown in Table 1 below.
1. Relative Permittivity
   The dielectric constant at a frequency of 28 GHz was measured using a network analyzer equipment.
2. Thermal Conductivity
   It was measured in LFA by using ASTM E1461.
   In addition, after placing the LED at a predetermined interval on the circumference of a circle with a diameter of 25 mm, a thermometer was placed in the center of the circle, and a measuring equipment was manufactured so that a predetermined voltage could be applied to the LED. The measuring equipment was placed in an acrylic chamber of 32 cm×30 cm×30 cm in width, length, and height, respectively, and the temperature inside the acrylic chamber was adjusted to be 25±0.2° C. After placing a heat dissipation sheet on the LED of the measuring equipment, a predetermined input power was applied to the LED, and after a predetermined time had elapsed, a thermal image was taken from the upper portion of the heat dissipation sheet and the temperature of the thermometer in the measuring equipment was measured. Afterwards, the average temperature of the portion of the heat dissipation sheet corresponding to the LED was calculated to show the average temperature through the results of thermal imaging, and the temperature calculated through the thermometer in the measuring equipment was shown as the T.C value, respectively.

In addition, as a standard for evaluating heat radiation performance, the same input power was applied to the LED of the measuring equipment in the absence of the heat dissipation sheet, and after the same time had elapsed, thermal imaging was taken from the upper portion of the LED and the temperature of the thermometer in the measuring equipment was measured, and the result was defined as a default value, and the average temperature taken in the thermal image without the heat dissipation sheet was 53.8° C., and the T.C. was 66.3° C.

Experimental Example 2

Figure 7:
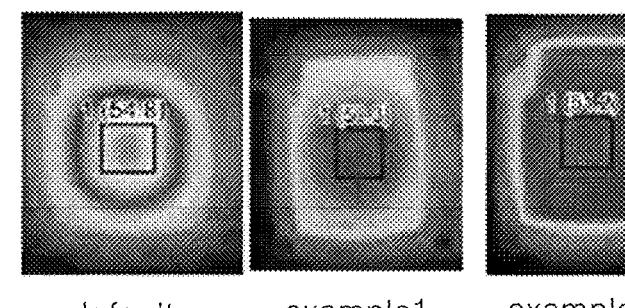
FIGS. 7 and 8 are thermal images taken in Experimental Example 2 and Experimental Example 3, respectively.
Figure 7:
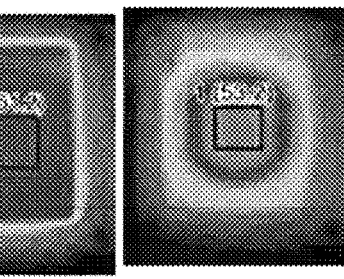
Figure 7:
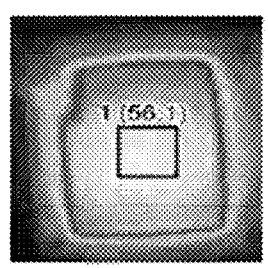

The wireless power transmission antenna was used as a low frequency antenna, the wireless power transmission efficiency and heat radiation characteristics of the heat dissipation sheets according to Examples 1, 2, Comparative Examples 1, 2 were evaluated, and the results were shown in Table 1 below. In addition, a photograph of the thermal image taken during the evaluation of the heat radiation characteristic was shown in FIG. 7. On the other hand, when there was no heat dissipation sheet, wireless power transmission efficiency and heat radiation characteristics were tested together, and the result value was used as a default value.

Figures 5, 6:
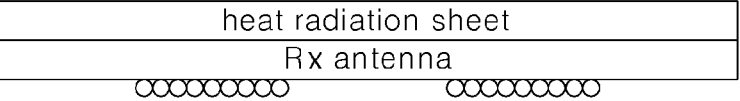
FIGS. 5 and 6 are schematic diagrams illustrating a positional relationship between a transmission antenna for wireless power transmission, a reception antenna for wireless power transmission and a heat dissipation sheet used to evaluate the influence of heat dissipation sheet on wireless power transmission efficiency and heat radiation characteristics, according to an example and a comparative example.

Specifically, after preparing a transmission antenna and a reception antenna for wireless power transmission having a frequency of 105 to 205 kHz as an operating frequency of a low frequency antenna, the heat dissipation sheet was placed on the opposite side of the side where the flat-plate coil was arranged in the transmission antenna as shown in FIG. 5. The transmission antenna and the reception antenna were placed so that each of the flat-plate coils faced each other, and then, the separation distance between the flat-plate coils in each antenna was 1 mm. After applying a voltage of 12V to the transmission antenna for wireless power transmission, the efficiency was measured by adding a load for each power (W) of the reception antenna for wireless power transmission.

In addition, as for the heat radiation characteristics, the temperature of the hottest point in the thermal image was measured using a thermal image taken from the upper direction of the reception antenna for wireless power transmission after applying a voltage of 12V to the transmission antenna for wireless power transmission.

As seen in Table 1, in Examples 1 and 2 using graphite as the heat dissipation filler, the efficiency during wireless power transmission was increased compared to the default case in which the heat dissipation sheet was not provided, and the heat generated from the wireless power reception antenna was rapidly transferred to an outside. Accordingly, the temperature of the highest point was measured at a low level of 3.6 to 4.5° C., which confirmed that the heat radiation characteristics were very excellent.

However, it was confirmed that the wireless power transmission efficiency in Comparative Example 1 was at the same level or somewhat superior to the wireless power transmission efficiencies in Examples 1 and 2, but the heat radiation characteristic was remarkably poor.

In addition, it was confirmed that although the thermal conductivity in Comparative Example 2 was very excellent compared to Example 1, when employed in wireless power transmission, the wireless power transmission efficiency was also significantly reduced, and the heat radiation characteristics were rather increased compared to the default in which the heat dissipation sheet was not employed.

Experimental Example 3

Figure 8:
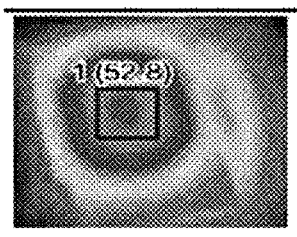
Figure 8:
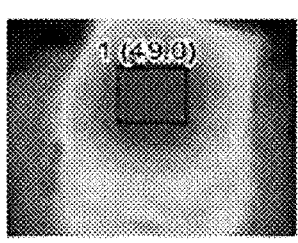
Figure 8:
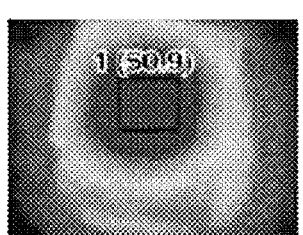

In the same manner as in Experimental Example 2, the wireless power transmission efficiency and heat radiation characteristics according to Examples and Comparative Examples were evaluated, but the arrangement position of the heat dissipation sheet was placed between the flat-plate coil of the transmission antenna for wireless power transmission and the flat-plate coil of the reception antenna for wireless power transmission, and the distance between the flat-plate coils on the heat dissipation sheet and the transmission antenna for wireless power transmission was changed to 1 mm, as shown in FIG. 6. The results of the evaluated wireless power transmission efficiency and heat radiation characteristics were shown in Table 2 and FIG. 8.

TABLE 1

| | | | Wireless power transmission | |
| --- | --- | --- | --- | --- |
| | Relative permittivity (@28 GHz) | Thermal Conductivity (W/m · K) | Wireless power transmission efficiency (%) | Heat radiation characteristic (Maximum temperature (° C.)) |
| Default | — | — | 80.5 | 54.8 |
| Example 1 | 90.2 | 89.2 | 80.8 | 50.3 |
| Example 2 | 85.0 | 1500 | 79.1 | 51.2 |
| Comparative Example 1 | 3.2 | 42.1 | 81.0 | 53.2 |
| Comparative Example 2 | Not measurable | 400 | 77.2 | 56.1 |

TABLE 2

| | Relative permittivity (@28 GHz) | Thermal conductivity (W/m · K) | Wireless power transmission | |
|---|---|---|---|---|
| | | | Wireless power transmission efficiency (%) | Heat radiation characteristic (Maximum temperature (° C.)) |
| default | — | — | 80.5 | 54.8 |
| Example 1 | 90.2 | 89.2 | 79.9 | 49.0 |
| Example 2 | 85.0 | 1500 | 0 | Not measurable |
| Comparative Example 1 | 3.2 | 42.1 | 80.5 | 59.9 |
| Comparative Example 2 | Not measurable | 400 | 0 | Not measurable |

As seen in Table 2, when the heat dissipation sheet was positioned on the movement path of the wireless power transmission signal, the copper foil heat dissipation sheet of Comparative Example 2 did not operate the wireless power transmission function, which suggested that the heat dissipation sheet blocked the wireless power transmission signal.

In addition, the wireless power transmission efficiency of the heat dissipation sheet of Comparative Example 1 was somewhat superior to that of Example 1, but its heat radiation characteristic was significantly increased compared to the default in which the heat dissipation sheet was not employed, which confirmed that the heat radiation characteristic itself was not expressed.

On the other hand, when the case of Example 2 using artificial graphite as the heat dissipation filler was positioned on the movement path of the wireless power transmission signal, it was confirmed that the wireless power transmission signal was blocked. Accordingly, it was confirmed that the case of Example 2 could be used as the heat dissipation sheet adopted for a lower frequency antenna, only when it was positioned in a place other than the movement path of the wireless power transmission signal. However, it was confirmed that the heat dissipation sheet according to Example 1 exhibited excellent heat radiation characteristics while minimizing the decrease in wireless power transmission efficiency even when positioned on the movement path of the wireless power transmission signal. These results showed that the limitation of the conventional heat dissipation sheet in which the position must be arranged in consideration of the movement path of the wireless power transmission signal was resolved, and it was confirmed that the heat dissipation sheet using graphite flakes was very suitable for realizing the low frequency antenna module.

Example 3

It was prepared in the same manner as in Example 1, except that the thickness of the final heat dissipation sheet was changed to 60 μm to prepare a heat dissipation sheet as shown in Table 3 below.

Comparative Example 3

Manufactured in the same manner as in Example 3, but 3 parts by weight of DICY as a curing agent and 200 parts by weight of methyl ethyl ketone as a solvent were mixed based on 100 parts by weight of the bisphenol A epoxy component (Kukdo, YG-011) as a matrix forming component, to prepare a sheet forming composition, and the prepared sheet forming composition was treated on a substrate to a predetermined thickness using a comma coater, cured at 150° C. for 30 minutes, and then cooled in the same manner as in Example 1 to prepare the heat dissipation sheet having the final thickness of 60 μm, and the content of the heat dissipation filler of about 90% by weight.

Comparative 4

The same heat dissipation filler as in Example 1 was used, but it was carried out in the same manner as in Example 1, except that the matrix forming component was changed to thermoplastic polyurethane (TPU). The prepared heat dissipation sheet had the final thickness of 60 μm, and the content of the heat dissipation filler of about 90% by weight.

Experimental Example 4

100 each of heat dissipation sheets according to Example 3 and Comparative Examples 3 and 4 were prepared in the same size. Then, among 100 specimens, the number of specimens with cracks or breakage and the number of specimens with pores on the surface or shrinkage were counted, and the results were shown as a percentage in Table 3 below.

TABLE 3

| | Example 3 | Comparative Example 3 | Comparative Example 4 |
|---|---|---|---|
| Matrix forming component | Rubber-based component (SBR) | Epoxy component | Polyurethane component |
| Percentage (%) of cracked/broken sheets | 0 | 80 | 0 |
| Percentage (%) of shrunk/porous sheets | 1 | 0 | 53 |

As seen in Table 3, it was confirmed that the heat dissipation sheet of Example 3 using the rubber-based component as the matrix forming component did not generate cracks or breakages, did not change shape such as shrinkage, and had excellent surface quality.

Example 4

It was prepared in the same manner as in Example 3, except that the content of the surface-modified graphite was changed to 1200 parts by weight to prepare a heat dissipation sheet as shown in Table 4 below.

Example 5

It was prepared in the same manner as in Example 3, except that the type of crosslinking agent was changed to hexamethylene diisocyanate to prepare a preliminary sheet, $$\text{thickness reduction rate (\%)} = \frac{\text{thickness of preliminary sheet } (\mu m) - \text{thickness of heat dissipation sheet } (\mu m)}{\text{thickness of preliminary sheet } (\mu m)} \quad \text{[Equation 1]}$$

$$\text{thickness change rate (\%)} = \frac{\text{thickness of heat dissipation sheet after left } (\mu m) - \text{thickness of heat dissipation sheet before left } (\mu m)}{\text{thickness of heat dissipation sheet after left } (\mu m)} \quad \text{[Equation 2]}$$

TABLE 4

|  | Example 4 | Example 5 | Comparative Example 5 |
| --- | --- | --- | --- |
| Matrix forming component | SBR | SBR | SBR |
| Type of crosslinking agent | Peroxide-based | Isocyanate-based | Not used |
| Thickness of preliminary sheet(μm) | 140 | 140 | 140 |
| Thickness of heat dissipation sheet immediately after manufactured (μm) | 82.0 | 82.0 | 101.0 |
| Thickness reduction rate (%) | 41.4 | 41.4 | 27.9 |
| Density (g/m$^3$) | 1.81 | 1.81 | 1.71 |
| Thickness of heat dissipation sheet after left for 50 hours (pm) | 82.2 | 90.2 | 138 |
| Thickness change rate (%) | 0.3 | 10.0 | 36.6 | and a heat dissipation sheet as shown in Table 4 was prepared through crosslinking and cooling processes.

Comparative Example 5

It was prepared in the same manner as in Example 3, but without adding a crosslinking agent, a heat dissipation sheet as shown in Table 4 was prepared.

Experimental Example 5

The following physical properties were evaluated for the heat dissipation sheets according to Examples 3 to 5 and Comparative Example 5, and the results are shown in Table 4.

Specifically, after measuring dimensions such as thickness and weight immediately after manufacturing the heat dissipation sheet, a thickness reduction rate was calculated according to Equation 1 below. In addition, a thickness change rate was calculated according to Equation 2 below after the manufactured heat dissipation sheet was left at 40° C. for 50 hours.

As seen in Table 4, in Example 4 in which a peroxide type crosslinking agent was used and Example 5 in which an isocyanate type crosslinking agent was used, the thickness change rate after preparation was 10% or less, which was superior to that in Comparative Example 5.

Examples 6 to 8

It was prepared in the same manner as in Example 4, but the cooling temperature was changed as shown in Table 5 below to prepare a heat dissipation sheet as shown in Table 5 below.

Experimental Example 6

For the heat dissipation sheets of Example 4 and Examples 6 to 8, the thickness change rate was calculated in the same manner as in Experimental Example 5. In addition, among a total of 1000 manufactured heat dissipation sheets for each Example, the number of heat dissipation sheets attached to the second press was counted and shown in Table 5 below.

TABLE 5

|  | Example 4 | Example 6 | Example 7 | Example 8 |
| --- | --- | --- | --- | --- |
| Matrix forming components | SBR | SBR | SBR | SBR |
| Type of crosslinking agent | Peroxide-based | Peroxide-based | Peroxide-based | Peroxide-based |
| Cooling temperature (° C.) | 50 | 60 | 65 | 70 |
| Thickness of preliminary sheet (μm) | 140 | 140 | 140 | 140 |
| Thickness of heat dissipation sheet immediately after manufactured (μm) | 82.0 | 82.0 | 82.0 | 82.0 |
| Thickness reduction rate (%) | 41.4 | 41.4 | 41.4 | 41.4 |

TABLE 5-continued

|  | Example 4 | Example 6 | Example 7 | Example 8 |
|---|---|---|---|---|
| Thickness of heat dissipation sheet after left for 50 hours (μm) | 82.2 | 82.74 | 83.80 | 86.76 |
| Thickness change rate (%) | 0.3 | 0.9 | 2.2 | 5.8 |
| Number of heat dissipation sheets attached to a second press | 0 | 3 | 26 | 100 |

As seen in Table 5, it was confirmed that in Examples 7, 8 in which the cooling temperature exceeded 60° C., the number of heat dissipation sheets adhered to the second press increased, and the thickness change rate also increased.

Example 9

A heat dissipation sheet was manufactured in the same manner as in Example 3, except for performing a cooling process.

Experimental Example 7

For the heat dissipation sheets according to Examples 4 and 9, surface SEM photographs were taken, and the results were shown in FIGS. 9 (Example 9) and 10 (Example 4).

As seen in FIGS. 9 and 10, it was confirmed that FIG. 9 which was a photograph of the heat dissipation sheet of Example 9 that has not undergone the cooling process showed a rough surface, whereas the surface quality of the heat dissipation sheet of Example 4 that has been subjected to the cooling process showed excellent.

Examples 10 to 21

The heat dissipation sheet as shown in Tables 6 and 7 was manufactured in the same manner as in Example 4, except that the particle size of the heat dissipation filler and the content of the heat dissipation filler were changed as shown in Tables 6 and 7 below.

Experimental Example 8

The following physical properties were evaluated for the heat dissipation sheets according to Example 4 and Examples 10 to 21, and were shown in Tables 6 and 7 below.

1. Evaluation of Heat Radiation Characteristics

Thermal conductivity was calculated using the thermal diffusivity measured using LFA, specific heat measured using DSC, and the density of the heat dissipation sheet.

In addition, after placing the LED at a predetermined interval on the circumference of a circle with a diameter of 25 mm, a thermometer was placed in the center of the circle, and a measuring equipment was manufactured so that a predetermined voltage could be applied to the LED. The measuring equipment was placed in an acrylic chamber of 32 cm×30 cm×30 cm in width, length, and height, respectively, and the temperature inside the acrylic chamber was adjusted to be 25±0.2° C. After placing a heat dissipation sheet on the LED of the measuring equipment, a predetermined input power was applied to the LED, and after a predetermined time had elapsed, a thermal image was taken from the upper portion of the heat dissipation sheet and the temperature of the thermometer in the measuring equipment was measured. Afterwards, the average temperature of the portion of the heat dissipation sheet corresponding to the LED was calculated to show the average temperature through the results of thermal imaging, and the temperature calculated through the thermometer in the measuring equipment was shown as the T.C value, respectively.

In addition, as a standard for evaluating heat radiation performance, the same input power was applied to the LED of the measuring equipment in the absence of the heat dissipation sheet, and after the same time had elapsed, thermal imaging was taken from the upper portion of the LED and the temperature of the thermometer in the measuring equipment was measured, and the result was defined as a default value, and the average temperature taken in the thermal image without the heat dissipation sheet was 53.8° C., and the T.C. was 66.3° C.

2. Surface Quality

In order to evaluate the amount of heat dissipation fillers come off from the surface of the heat dissipation sheet, an adhesive sheet of the same size as the manufactured heat dissipation sheet was attached to one surface of the heat dissipation sheet and then removed. The peeled adhesive sheet was divided into 10 horizontally and vertically to partition them into a total of 100 cells, and the number of cells on which the heat dissipation filler was adhered was counted.

3. Flexibility Assessment

For a total of 1000 heat dissipation sheets for each example, it was observed whether cracks or breakage occurred when bent with a curvature of 20 mm, and the number of sheets in which cracks or breakage occurred was counted. Then, based on the number of Example 10 as 100%, the number of broken sheets in the remaining examples was expressed as a relative percentage.

TABLE 6

|  |  | Example 4 | Example 10 | Example 11 | Example 12 | Example 13 | Example 14 | Example 15 |
|---|---|---|---|---|---|---|---|---|
|  | Thickness of heat dissipation sliced(μm) | 60 | 60 | 60 | 60 | 60 | 60 | 60 |
| heat dissipation filler | Total content (wt %) | 90 | 92 | 93 | 90 | 88 | 88 | 90 |
|  | average Particle diameter (μm) | 80 | 80 | 80 | 70 | 120 | 130 | 60 |

TABLE 6-continued

| | Example 4 | Example 10 | Example 11 | Example 12 | Example 13 | Example 14 | Example 15 |
|---|---|---|---|---|---|---|---|
| Thermal conductivity (W/mK) | 120 | 125 | Not measurable | 110 | 120 | 118 | 90 |
| Flexibility (%) | 25 | 100 | — | 10 | 49 | 143 | 5 |
| Surface quality | 7 | 45 | — | 17 | 46 | 65 | 33 |

As seen in Table 6, it was confirmed that when as in Example 11, the content of the heat dissipation filler exceeded 92% by weight and the heat dissipation filler was highly filled, the heat dissipation sheet itself was difficult to manufacture. In addition, it was confirmed that in the case of Example 14 in which the average particle diameter was rather large, the surface quality was not good and the flexibility was significantly reduced. On the other hand, it was confirmed that in the case of Example 15 in which the average particle diameter was too small, the surface quality was deteriorated.

Example 22 to 23

The heat dissipation sheet as shown in Table 7 was prepared in the same manner as in Example 4, except that the type of the silane compound was changed to vinyltrimethoxysilane, which is a vinyl silane compound, or 3-glycidoxypropyltrimethoxysilane, which is an epoxy silane compound, respectively.

Example 24 to 27

A heat dissipation sheet as shown in Table 8 below was prepared in the same manner as in Example 4, except that the content of the silane compound was changed.

Comparative Example 6

A heat dissipation sheet as shown in Table 8 below was prepared in the same manner as in Example 4, except that the heat dissipation filler was changed to graphite flakes of which surface was not modified, and the silane compound used for surface modification was added to a sheet forming composition.

Experimental Example 9

After peeling off the release film from the heat dissipation sheet according to Example 4, Examples 22 to 27, a protective film with a thickness of 5 μm in which an adhesive layer of 3 μm was formed on one side of a PET film having a thickness of 2 μm was attached to the matrix surface. Then, after partially separating the interface on the side between the protective film and the matrix of the heat dissipation sheet, the separated protective film was peeled off using a tensile tester ASTM D903 condition until the protective film broke. Then, by observing the peeled matrix of the heat dissipation sheet, it was confirmed whether the matrix was separated by some thickness in the thickness direction, by performing an experiment on a total of 20 specimens for each Example and Comparative Example. For 20 specimens, the case where the matrix was not peeled off and the protective film was neatly separated was indicated by x, and the case where the matrix was partially separated in the thickness direction was indicated by ○, and the number was indicated together. The results were shown in Table 7 below.

Figure 11:
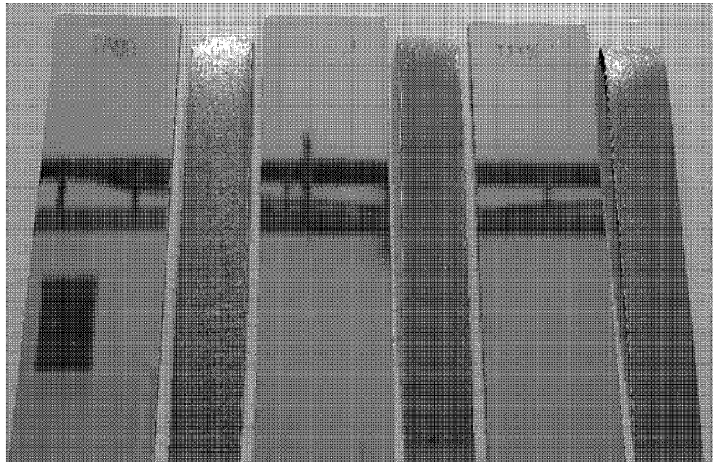
FIGS. 11 to 13 are photographs of experimental results confirming whether a matrix is separated after peeling off a protective film for the heat dissipation sheets according to Examples 4, 22 and 23, respectively.
Figure 12:
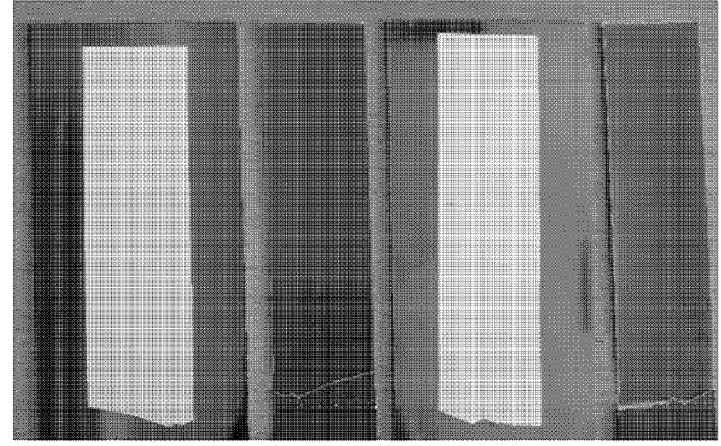
Figure 13:
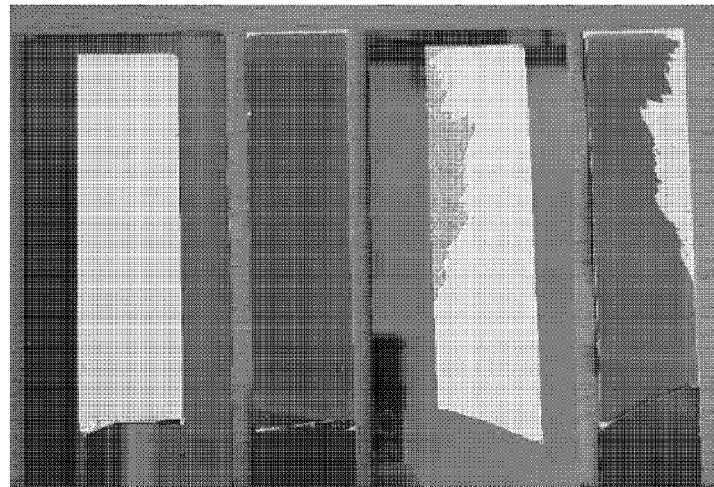
Figure 14:
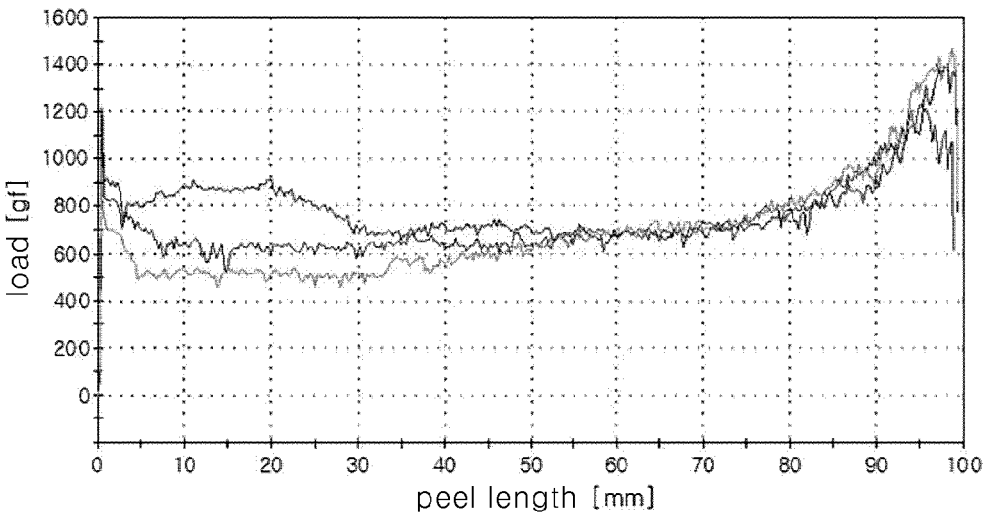
FIGS. 14 to 17 are graphs of adhesive strength according to a peeling length of a protective film in Examples 4, 26, 22 and 23, respectively.
Figure 15:
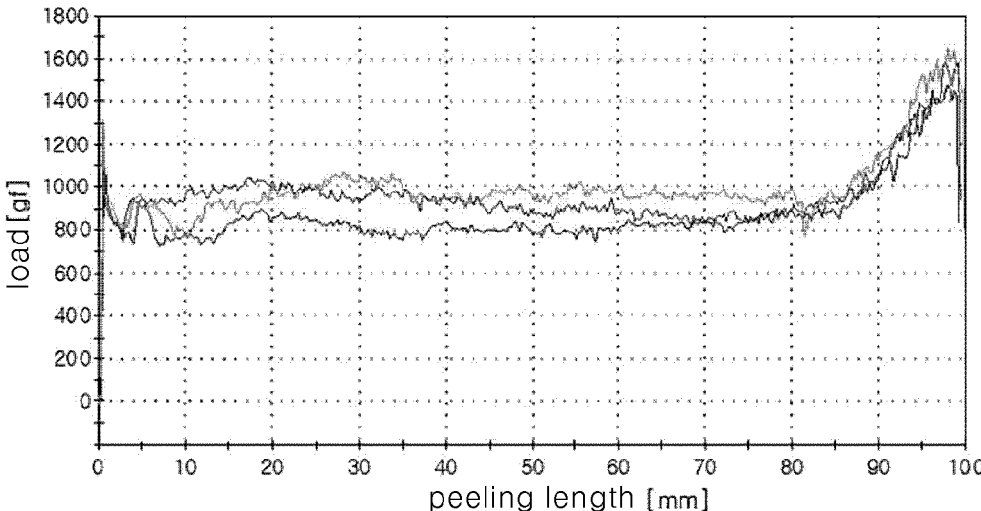

In addition, after the evaluation of Example 4 and Examples 22 and 23, pictures were taken and shown in FIGS. 11 to 13, respectively.

It was confirmed that in the case of Example 4 of FIG. 11, tearing did not occur in the matrix, but in the case of Examples 22 and 23 of FIGS. 12 and 13, the matrix was torn.

In addition, the graphs of adhesive force according to the peeling length of the protective film for Example 4, Example 26, Example 22, and Example 23 were shown in FIGS. 14 to 17, respectively.

Figure 16:
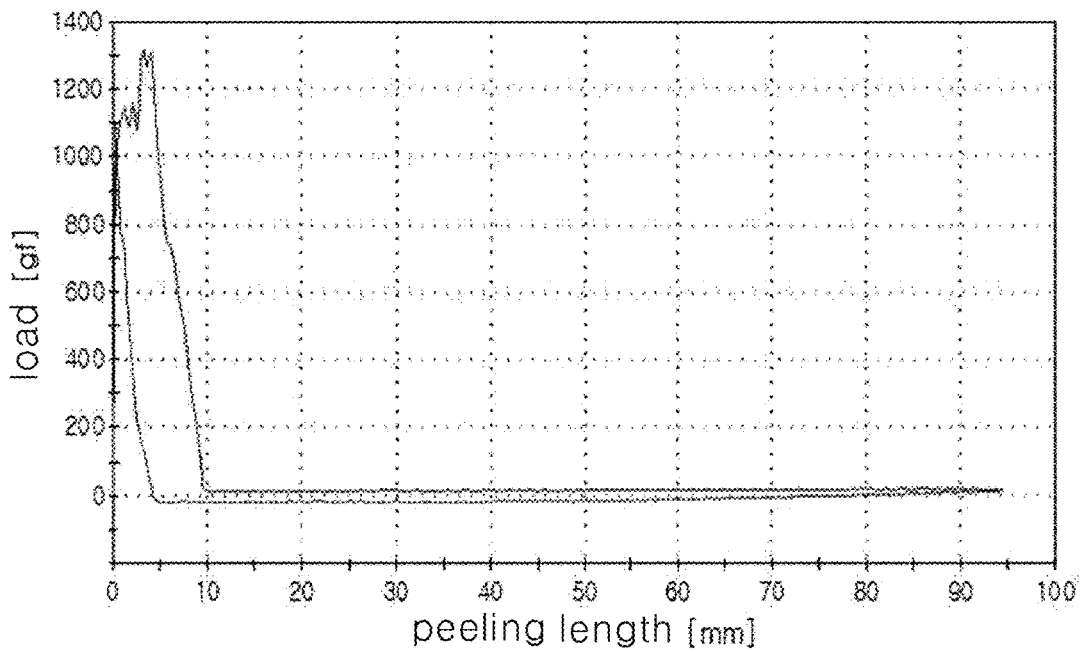
Figure 17:
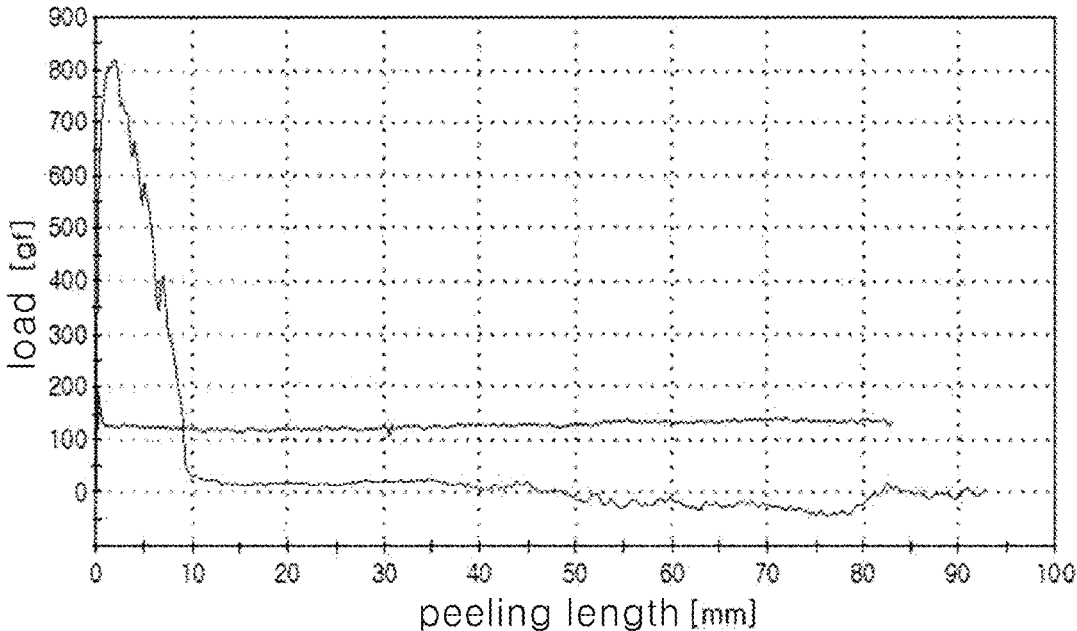

As seen in FIGS. 16 and 17, in the case of Examples 22 and 23, the adhesive force was remarkably reduced to 0 level shortly after the start of the evaluation, which confirmed that the matrix was peeled off at any point in the thickness direction.

Experimental Example 10

After removing the release film after manufacturing the heat dissipation sheet according to Example 4 and Examples 22 to 27, the presence or absence of the heat dissipation filler remaining on the release film was visually checked. In Table 7 below, the case where the heat dissipation filler remained was indicated by ○, and the case where the heat dissipation filler did not remain was indicated by x.

TABLE 7

| | Example 4 | Example 22 | Example 23 | Example 24 | Example 25 | Example 26 | Example 27 |
|---|---|---|---|---|---|---|---|
| Silane compound(Type/ content(wt %) | Amino silane/2.5 | Vinyl silane/2.5 | Epoxy silane/2.5 | Amino silane/0.5 | Amino silane/1.0 | Amino silane/4.0 | Amino silane/5.0 |
| Location of silane compound | Surface of heat dissipation filler | Surface of heat dissipation filler | Surface of heat dissipation filler | Surface of heat dissipation filler | Surface of heat dissipation filler | Surface of heat dissipation filler | Surface of heat dissipation filler |
| Thermal conductivity (W/mK) | 120 | 119 | 114 | 120 | 120 | 121 | 110 |
| Whether/number of matrix separation | x | ○/20 | ○/20 | ○/19 | ○/4 | x | x |

TABLE 7-continued

| | Example 4 | Example 22 | Example 23 | Example 24 | Example 25 | Example 26 | Example 27 |
|---|---|---|---|---|---|---|---|
| Whether heat dissipation filler is adhered to release film | x | x | x | x | x | x | o |

As seen in FIGS. 11 to 17 and Table 7, it was confirmed that in the heat dissipation sheets according to Examples 22 and 23 where the silane compounds having a vinyl group and an epoxy group were used, the matrix itself was separated by a certain thickness. As a result, it was expected that the interfacial bonding between the heat dissipation filler of graphite flake and the matrix was not good, so that the interface was lifted, and the lift portion was torn out by the applied external force. However, in the case of Example 4 using the silane compound having an amino group, it was confirmed that the interfacial bond between the heat dissipation filler of graphite flake and the matrix was good, so that the matrix separation did not occur based on these interfaces.

In addition, in the case of Example 27 where the content of the amino silane compound was high, it was confirmed that the matrix component was adhered to the release film, and the heat radiation effect was also reduced.

Although one embodiment of the present invention has been described above, the spirit of the present invention is not limited to the embodiments presented herein, and those skilled in the art who understand the spirit of the present invention may easily suggest other embodiments by providing, changing, deleting, adding components within the scope of the same spirit, but this will also fall within the scope of the present invention.

The invention claimed is:

1. A heat dissipation sheet for a low frequency antenna which is disposed on a low frequency antenna with an operating frequency of 50 kHz to 350 kHz, the heat dissipation sheet for a low frequency antenna comprising:
   a matrix including a crosslinked rubber-based resin in which styrene-butadiene rubber is crosslinked with a crosslinking agent comprising at least one of a peroxide-based compound or an isocyanate-based compound; and
   a heat dissipation filler dispersed in the matrix and including graphite,
   wherein the heat dissipation filler is comprised at 80 to 92 wt % of a total weight of the heat dissipation sheet,
   wherein the heat dissipation filler comprises 1.0 to 4.0 parts by weight of an amino silane compound that modifies a surface of the heat dissipation filler based on 100 parts by weight of the heat dissipation filler, and the heat dissipation filler is surface-modified, and
   wherein the amino silane compound includes one or more non-epoxy silane compounds selected from the group consisting of 3-aminopropyltriethoxysilane, 3-aminopropyltrimethoxysilane and 3-aminopropylmethyldimethoxysilane.

2. The heat dissipation sheet for a low frequency antenna according to claim 1, wherein the graphite is graphite flake.

3. The heat dissipation sheet for a low frequency antenna according to claim 1, wherein the heat dissipation filler has an average particle diameter of 70 to 120 μm.

4. The heat dissipation sheet for a low frequency antenna according to claim 1, wherein the matrix includes a crosslinked product in which styrene-butadiene rubber (SBR) is crosslinked with an isocyanate-based crosslinking agent, the graphite has a surface modified with an amino silane compound.

5. The heat dissipation sheet for a low frequency antenna according to claim 1, wherein the heat dissipation sheet has a density of 1.7 g/m$^3$ or more.

6. The heat dissipation sheet for a low frequency antenna according to claim 1,
   wherein the heat dissipation sheet has a surface resistance of 0.1 to 100Ω/□ and a thermal conductivity of 80 to 150 W/m□k.

7. A method for manufacturing a heat dissipation sheet for a low frequency antenna, comprising:
   preparing a surface-modified heat dissipation filler treated to contain 1.0 to 4.0 parts by weight of an amino silane compound based on 100 parts by weight of a heat dissipation filler including graphite, wherein the amino silane compound includes one or more non-epoxy silane compounds selected from the group consisting of 3-aminopropyltriethoxysilane, 3-aminopropyltrimethoxysilane and 3-aminopropylmethyldimethoxysilane; and
   preparing a preliminary sheet by mixing the surface-modified heat dissipation filler with a matrix forming component comprising a rubber-based resin comprising styrene-butadiene rubber (SBR) and a crosslinking agent comprising at least any one of a peroxide-based compound or an isocyanate-based compound; and
   pressurizing a prepared preliminary sheet and crosslinking a rubber-based resin to manufacture a heat dissipation sheet to form a matrix comprising a rubber-based resin in which styrene-butadiene rubber (SBR) is crosslinked,
   wherein the heat dissipation filler is comprised at 80 to 92 wt % of a total weight of the heat dissipation sheet.

8. The method for manufacturing a heat dissipation sheet for a low frequency antenna according to claim 7, wherein the pressurizing the prepared preliminary sheet and the crosslinking a rubber-based resin comprises:
   crosslinking the preliminary sheet while applying heat and pressure at a temperature of 100 to 180° C.; and
   cooling the crosslinked preliminary sheet to a temperature of 18 to 60° C. while applying pressure.

9. A low frequency antenna module comprising:
   a low frequency antenna having an operating frequency of 50 kHz to 350 kHz;
   the heat dissipation sheet according to claim 1; and
   a magnetic field shielding sheet.

10. The low frequency antenna module according to claim 9, wherein the low frequency antenna is disposed between the heat dissipation sheet and the magnetic field shielding sheet.

11. The low frequency antenna module according to claim 9, wherein the lower frequency antenna module is a low frequency-reception antenna module which receives a wireless signal transmitted from a low frequency-transmission antenna having an operating frequency of 50 kHz to 350 kHz, wherein the low frequency antenna is a low frequency-reception antenna, and wherein the heat dissipation sheet is arranged to be disposed on a movement path of a wireless signal between the low frequency-transmission antenna and the low frequency-reception antenna.

* * * * *